United States Patent
Holm et al.

(10) Patent No.: US 9,314,729 B2
(45) Date of Patent: Apr. 19, 2016

(54) DEVICE COMPRISING A CENTRIFUGAL SEPARATOR AND A METHOD FOR CLEANING OF A GAS

(71) Applicant: ALFA LAVAL CORPORATE AB, Lund (SE)

(72) Inventors: Staffan Holm, Rönninge (SE); Jan Skoog, Skogås (SE)

(73) Assignee: ALFA LAVAL CORPORATE AB, Lund (SE)

( * ) Notice: Subject to any disclaimer, the term of this patent is extended or adjusted under 35 U.S.C. 154(b) by 261 days.

(21) Appl. No.: 14/343,273

(22) PCT Filed: Sep. 25, 2012

(86) PCT No.: PCT/EP2012/068886
§ 371 (c)(1),
(2) Date: Mar. 6, 2014

(87) PCT Pub. No.: WO2013/045453
PCT Pub. Date: Apr. 4, 2013

(65) Prior Publication Data
US 2014/0238237 A1 Aug. 28, 2014

(30) Foreign Application Priority Data
Sep. 29, 2011 (EP) .................................... 11183271

(51) Int. Cl.
*B01D 47/06* (2006.01)
*B01D 45/14* (2006.01)
(Continued)

(52) U.S. Cl.
CPC .............. *B01D 50/004* (2013.01); *B01D 45/14* (2013.01); *B01D 47/06* (2013.01); *B04B 5/12* (2013.01);
(Continued)

(58) Field of Classification Search
CPC ...... B01D 47/06; B01D 45/14; B01D 50/004; B01D 2247/04; B04B 5/12; B04B 2005/125; B05B 1/3046; B05B 7/0075; B05B 7/068; B05B 7/2494
USPC ............... 95/216, 218, 270; 96/268, 270, 282
See application file for complete search history.

(56) References Cited

U.S. PATENT DOCUMENTS 900,062 A 9/1908 Ernst
6,627,166 B1 9/2003 Simon
(Continued)

FOREIGN PATENT DOCUMENTS

FR 975984 A 3/1951
GB 1156711 A 7/1969
(Continued)

*Primary Examiner* — Frank Lawrence
(74) *Attorney, Agent, or Firm* — Birch, Stewart, Kolasch & Birch, LLP

(57) ABSTRACT

A device including a centrifugal separator for cleaning of a gas, especially a gas containing impurities in the form of solid and/or liquid particles, includes a stationary casing enclosing a separation space, an inlet channel, a rotating member in the separation space for separating at least a main part of the impurities from the gas, a gas outlet channel, and an outlet for discharging a separated phase of the gas. A supply member is provided for supplying a liquid, in the form of an aerosol, to the gas to be cleaned and which comprises a supply conduit with an outlet end, and an ejector nozzle connectable to a pressurized gas conduit and including a nozzle outlet. The nozzle outlet at the outlet end permits ejection of the aerosol from the outlet end by means of the pressurized gas supplied to the ejector nozzle and the nozzle outlet.

20 Claims, 2 Drawing Sheets

Figure 1:
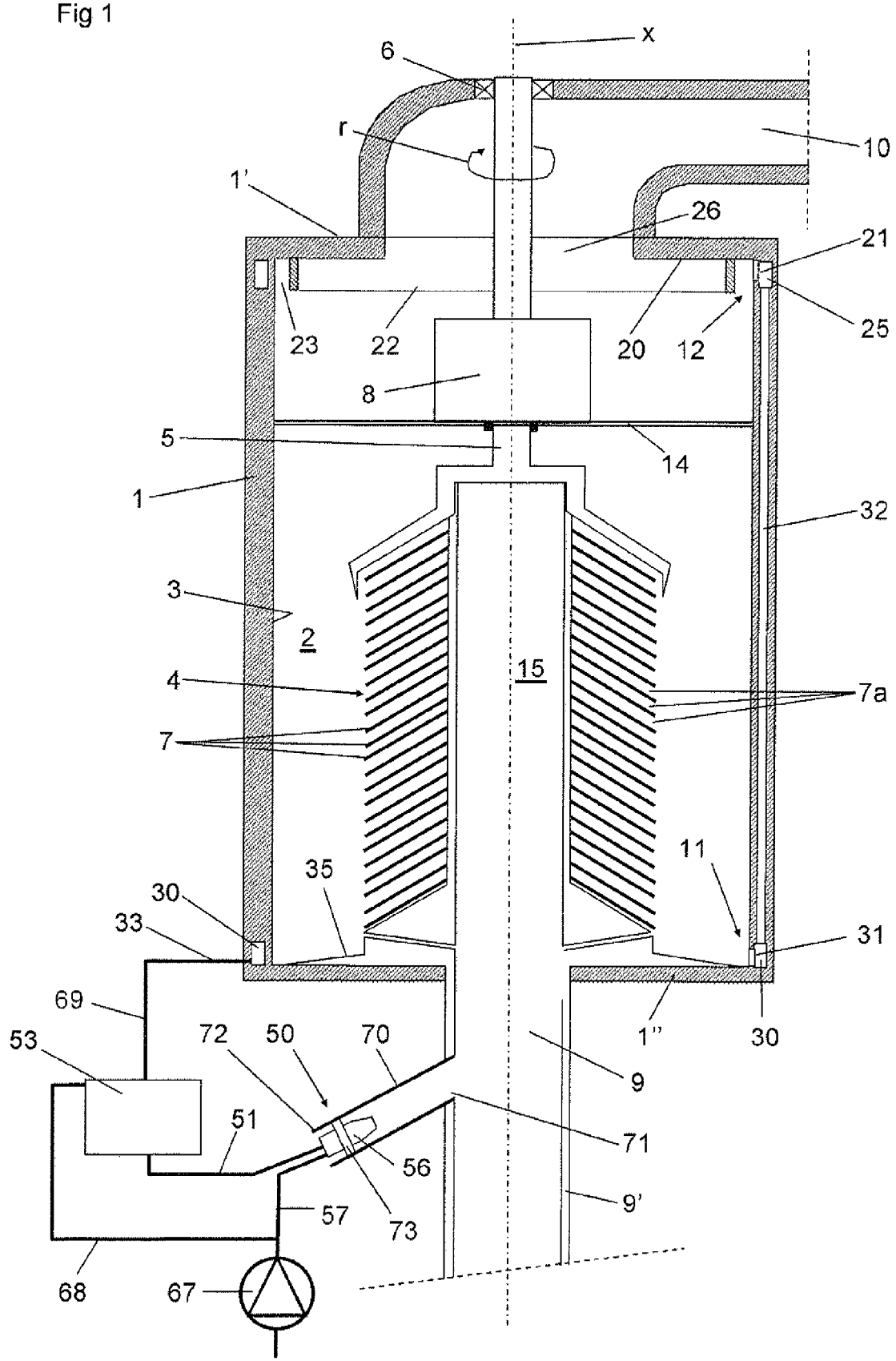
Figure 2:
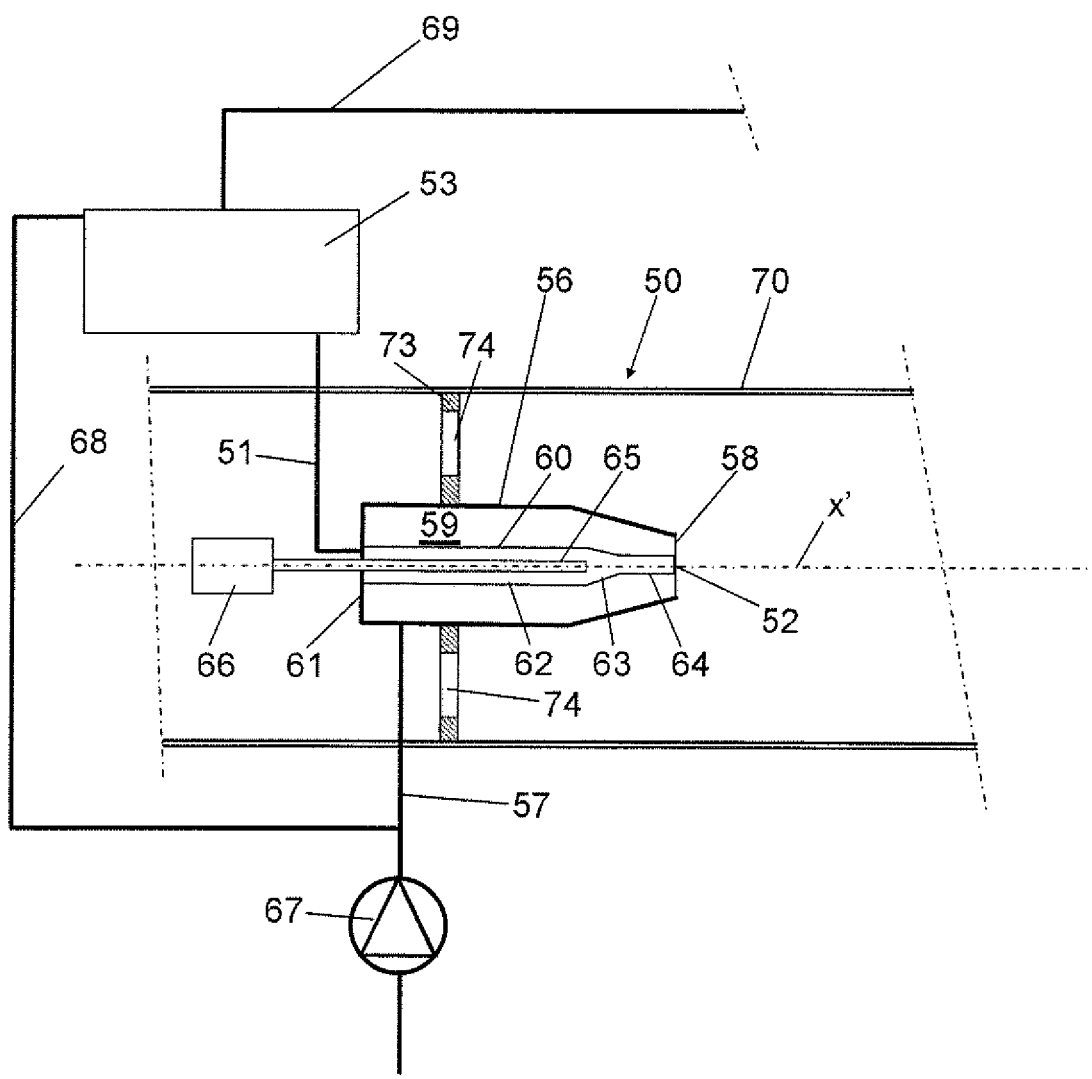

(51) Int. Cl.
  *B01D 50/00* (2006.01)
  *B04B 5/12* (2006.01)
  *B05B 7/00* (2006.01)
  *B05B 7/06* (2006.01)
  *B05B 7/24* (2006.01)
  *B05B 1/30* (2006.01)

(52) U.S. Cl.
  CPC ............... *B05B 7/0075* (2013.01); *B05B 7/068* (2013.01); *B05B 7/2494* (2013.01); *B01D 2247/104* (2013.01); *B04B 2005/125* (2013.01); *B05B 1/3046* (2013.01)

(56) References Cited

U.S. PATENT DOCUMENTS

| | | | | |
|---|---|---|---|---|
| 2003/0233939 | A1* | 12/2003 | Szepessy | B01D 45/14 95/270 |
| 2007/0051245 | A1 | 3/2007 | Yun | |
| 2009/0025563 | A1* | 1/2009 | Borgstrom | B01D 45/14 96/216 |
| 2011/0056374 | A1 | 3/2011 | Carlsson et al. | |

FOREIGN PATENT DOCUMENTS

| | | |
|---|---|---|
| GB | 2 038 468 A | 7/1980 |
| JP | 5-329315 A | 11/1974 |
| JP | 49-136867 A | 11/1974 |
| JP | 55-56818 A | 4/1980 |
| JP | 55-130771 U | 9/1980 |
| JP | 8-1069 A | 1/1996 |
| JP | 8-89911 A | 4/1996 |
| JP | 2007-73615 A | 3/2007 |
| JP | 2010-502419 A | 1/2010 |
| WO | WO 2008/029229 A1 | 3/2008 |
| WO | WO 2009/029022 A1 | 3/2009 |

* cited by examiner

DEVICE COMPRISING A CENTRIFUGAL SEPARATOR AND A METHOD FOR CLEANING OF A GAS

THE BACKGROUND OF THE INVENTION AND PRIOR ART

The present invention refers generally to a device comprising a centrifugal separator for cleaning of gases from impurities in the form of solid and/or liquid particles, such as oil mist. More specifically, the invention refers to a device comprising a centrifugal separator such as disclosed in WO 2009/029022.

Centrifugal separators of this kind are configured for cleaning of gases, such as air, especially contaminated or heavily contaminated air. The invention may in particular concern air in industrial environments, for instance air immediately in the proximity of various kinds of machines. Furthermore, this kind of centrifugal separators may be used for cleaning of other gases. For instance exhaust gases from stationary or mobile combustion engines.

One problem in connection with such cleaning is that the impurities contained in the gas to be cleaned contain a large proportion of solid or liquid particles which are very small and/or which have a relatively low density. Such small particles are difficult to separate also by means of centrifugal separators. A further problem in connection with such cleaning is that the particulate impurities contained in the gas to be cleaned get caught to the rotating member, and especially to the separation discs which are provided on the rotating member for rendering the separation efficient. Impurities, which may consist of both liquid and particulate impurities, form a more or less solid coating on the rotating member. This coating deteriorates the separation and makes it difficult to transport the impurities out from the separation space. Especially dry, i.e. solid, particles have a tendency to get caught on these surfaces, and thus form a relatively solid coating on the surfaces of the rotating member and in the separation space.

WO 2009/029022 presents a solution to these problems. However, in many case pressurised water, such as tap water, is not always available as the liquid to be supplied for humidifying the particles of the gas to be cleaned. When using pressurised water it is also difficult to achieve very small liquid particles.

Furthermore, cutting liquids are frequently used to improve the cutting process in machine tools. The cutting liquids may contain water-based emulsions, i.e. water and an oil, or various kinds of oils. When cleaning machine tool gases, i.e. gases, normally basically air, from or around a machine tool which contain such water-based emulsions, water may evaporate from the emulsion, which means that the cutting liquid turns into a highly viscous liquid, which is very hard to separate and discharge from the centrifugal separator. There is a risk that the liquid will get caught on the internal surfaces in the centrifugal separator.

A centrifugal separator of another kind is disclosed in U.S. Pat. No. 900,062. The cup-shaped rotating member is provided in an inner space of the separator. The rotating member has no separation discs, but a number of beaters and blades. A nozzle producing a spray is arranged so that the spray meets the gas entering the inner space in the gas inlet.

SUMMARY OF THE INVENTION

The object of the present invention is to provide a device of the kind defined above, which facilitates the separation of a phase, containing impurities in the form of solid and/or liquid particles, from a gas in a centrifugal separator, especially the separation of impurities having a large proportion of particles which are very small and/or has a low density. More specifically, it is aimed at a centrifugal separator which prevents impurities, in form of solid or liquid particles in a gas to be cleaned, from getting caught to inner surfaces of the separation space and especially surfaces of the rotating member.

This object is achieved by the device initially defined, which is characterised in that the supply member comprises an ejector nozzle connectable to a pressurised gas conduit and comprising a nozzle outlet, and that the nozzle outlet is provided at the outlet end of the supply conduit and arranged to permit ejection of the liquid in the form of said aerosol from the outlet end of the supply conduit by means of pressurised gas supplied to the ejector nozzle and the nozzle outlet.

By using pressurised gas to supply the aerosol, there is no need for a connection to tap water or pressurised water from a water network. The liquid forming the aerosol may be contained in any suitable local source, such as a container or tank.

By means of the supply of such an aerosol, the transport of the gas to be cleaned through the separation space, and especially through the rotating member is facilitated. The aerosol prevents in an efficient manner particles of the impurities from getting caught on surfaces of the rotating member and also other surfaces in the separation space. The aerosol will, when it comes into contact with the gas to be separated, humidify the particles of the impurities and thus adhere to these through adsorption and/or absorption. This means that the weight and size of the particles increase, which, especially where the particles are very small and/or have a low density, may contribute to more easily separating them from: the gas and transporting them out of the separation space. A further effect of the supply of the aerosol to the gas to be cleaned is that the humidification of the particles results in a lubrication of the particles by the liquid formed on the surface of the particles so that these will slide more easily on the surfaces of the rotating member and the separation space. Furthermore, it can be assumed that the surface structure of the particles is influenced by this humidification and adherence so that the risk that the impurities shall get burned or caught in any other manner to the surfaces of the rotating member and in the separation space is reduced.

An aerosol is defined as particles suspended in a gas. An aerosol thus comprises both the gas and particle phase. An upper limit for the particle size is defined by the fact that the particles are to be floating during some seconds in the gas before they precipitate which give them a size which is approximately 100 μm. The lower limit is defined when the particles becomes so small that they consist of individual molecules in the order of some nanometers. The particles which are included in the aerosol are in the present case liquid since they, as mentioned above, are to humidify the particles of the gas to be cleaned and adhere to these through adsorption or absorption.

Thanks to the ejector nozzle ejecting the aerosol by means of pressurised gas the size and the weight of the particles of the aerosol may be further reduced, which is advantageous for the ability of the aerosol to wet and to adhere to the particles contained in the gas to be cleaned.

The supply and addition of the aerosol to the gas to be cleaned is advantageous in case of cleaning of machine tool gases containing cutting liquids in the form of water-based emulsions. The addition of the aerosol will complement the evaporated water and/or prevent evaporation of water from the emulsion, and thus reduce the tendency to turn the emulsion into a highly viscous liquid.

According to an embodiment of the invention, the supply conduit has an outlet tube portion extending to the outlet end and along the ejector nozzle. Advantageously, the outlet tube portion is provided and extends in the ejector nozzle. The ejector nozzle may form an inner space surrounding the outlet tube portion.

According to a further embodiment of the invention, the outlet tube portion is tapering towards the outlet end, and wherein a needle is provided in the outlet tube portion for adjusting the character of the ejected aerosol, such as the size and the weight of the particles, and the quantity of liquid particles in the aerosol to be supplied to the gas to be cleaned.

According to a further embodiment of the invention, the ejector nozzle is configured to eject the liquid in the direction of the gas flow of the gas to be cleaned.

According to a further embodiment of the invention, the liquid tank is pressurised. Advantageously, the supply conduit may be connected to a source containing the liquid. Advantageously, the centrifugal separator may comprise a liquid tank forming said source. The liquid in the tank may be for instance water, oil, water-based emulsions etc., forming a mist of water particles or an oil mist, respectively.

According to a further embodiment of the invention, a communication conduit extends between the pressurised gas conduit and the liquid tank. By means of such a communication conduit, the tank may be pressurised, increasing the force by which the liquid is supplied to the supply member and the outlet tube portion. Such a communication conduit makes it possible to vary the amount of liquid supplied and also the size and the weight of the particles of the aerosol.

According to a further embodiment of the invention, a return conduit extends from the at least first outlet to the tank. Such a return conduit enables recovering of the liquid supplied to the supply member, which means a reduction of the consumption of the liquid. Such a solution is advantageous in case of a machine tool to where cutting liquids, containing water-based emulsions with oils, is used during the machining. The cutting liquid, separated from the gas in the centrifugal separator, may then also form the liquid to form the aerosol.

According to a further embodiment of the invention, the pressurised gas conduit is connected to a compressor producing the pressurised gas. Advantageously, the compressor forms a part of the device.

The object is also achieved by the method initially defined, which is characterised in that the method also comprises the step of: ejecting the liquid in the form of said aerosol from the outlet end of the supply conduit by supplying pressurised gas to an ejector nozzle having a nozzle outlet provided at the outlet end of the supply conduit. Advantageously, the method refers to cleaning of a gas from or around a machine tool.

BRIEF DESCRIPTION OF THE DRAWINGS

The invention is now to be explained more closely through a description of an embodiment shown by way of example, and with reference to the drawings attached hereto.

FIG. 1 discloses a vertical section through a device with a centrifugal separator according to an embodiment of the invention.

FIG. 2 discloses a sectional view of a supply member of the device in FIG. 1.

DETAILED DESCRIPTION OF AN EMBODIMENT

FIG. 1 discloses a device comprising a centrifugal separator for cleaning of a gas, especially a gas containing impurities in the form liquid or in the form of solid or liquid particles, such as oil mist.

The centrifugal separator comprises a stationary casing 1 which encloses a substantially closed separation space 2. The casing 1 has an inner wall surface 3 facing the separation space 2. The separation space 2 is arranged to permit the gas to flow therethrough in a gas flow.

The centrifugal separator further comprises a rotating member 4 which is provided in the separation space 2 and arranged to rotate in a direction r of rotation about an axis x of rotation, which also forms a centre axis through the casing 1. The centrifugal separator is in the embodiments disclosed provided in such a manner that the axis x of rotation extends substantially vertically so that the stationary casing 1 has an upper end 1' and a lower end 1".

The rotating member 4 comprises a spindle member 5, which is journalled in the casing 1 in the proximity of the upper end 1' by means of a bearing 6. The rotating member 4 comprises a plurality, or a large number of, of separation discs 7, which in the embodiment disclosed extend outwardly from axis x of rotation.

More specifically, the separation discs 7 are conical and extend obliquely downwardly, or upwardly, and outwardly from the spindle member 5.

The separation discs 7 are arranged in a stack so that a gap 7*a*, or a thin gap, is formed between each pair of adjacent discs 7 in the stack. The separation discs 7 form surfaces, or relatively large surfaces, on which the particles to be separated from the gas to be cleaned may be caught and transported outwardly towards the inner wall surface 3.

The centrifugal separator may also, as an alternative, be provided with a rotating member having separation discs extending in axial planes from the spindle member 5.

The rotating member 4 is driven by means of a drive member 8, for instance an electric motor, and is adapted to bring the gas to rotate in the direction r of rotation for separating, by means of centrifugal forces, the impurities from the gas. In the embodiment disclosed, the drive member 8 is mounted in the separation space 2 by means of a support device 14, which for instance may comprise three or more rods which extend radially from the drive member 8 to the inner wall surface 3 where they are mounted in a suitable manner.

In the embodiment disclosed, the centrifugal separator also comprises an inlet 9 for the gas to be cleaned, a gas outlet channel 10 for the cleaned gas, a first outlet 11 for the separated phase containing impurities and a second outlet 12 for the separated phase containing impurities.

The inlet 9 is provided centrally and extends through the lower end 1" of the casing 1. The inlet 9 conveys the gas in a central space 15 of the rotating member 4. From this central space 15, the gas is conveyed radially outwardly to the gaps 7*a* formed between the separation discs 7.

The gas outlet channel 10 is provided at the upper end 1' of the casing 1 downstream the rotating member 4. The gas leaving the gaps 7*a* between the separation discs 7 thus rotates at a high rotation speed in the direction r of rotation and will continue this rotating movement upwardly to the gas outlet channel 10 where the cleaned gas leaves the separation space 2.

The first outlet 11 is provided at the lower end 1" of the casing 1 and with regard to the gas flow upstream the second outlet 12 which is provided at the upper end 1', but downstream the gas outlet channel 10 with regard to the gas flow. In the embodiment disclosed, the first outlet 11 forms a main outlet, which is adapted for discharging a main part of the separated phase containing impurities, and the second outlet 12 forms a residual outlet adapted for discharging the separated phase containing substantially all remaining impurities.

It is to be noted that the separated phase contains impurities of both solid and liquid particles, which are discharged via the outlets 11 and 12. In case of cleaning gases from or around a machine tool, the separated phase may contain mostly liquid particles or a liquid formed by processing liquids, such as cutting liquids, used in the machining process.

The centrifugal separator also comprises an annular surface 20 which extends inwardly from the inner wall surface 3. In the embodiment disclosed, the annular surface 20 is formed by the upper end wall of the separation space 2. The angular surface 20 is in the embodiment disclosed substantially planar and perpendicular to the axis x of rotation, i.e. the annular surface 20 is parallel to a cross-sectional plan through the centrifugal separator. The annular surface 20 may also be slightly conical or somewhat domed.

The second outlet 12 comprises one or several outlet holes 21 which extend out through the inner wall surface 3. The second outlet 12 also comprises an annular shield element 22 which extends from the annular surface 20 at a distance from the inner wall surface 3 and the outlet holes 21. As can be seen in FIG. 1, the annular shield element 22 is located radially inside the outlet holes 21, i.e. the shield element 22 covers the outlet holes completely or substantially completely seen in a radial direction from the axis x of rotation. The shield element 22 extends in the embodiment disclosed substantially in parallel with the axis x of rotation but may also be inclined at least slightly in relation to the axis x of rotation.

The annular shield element 22 and the annular surface 20 thus form together with the inner wall surface 3 an annular channel 23 which is located radially inside the outlet holes 21. The channel 23 has an open annular upstream end and a closed annular downstream end. The annular surface 20 extends inwardly from the annular shield element 22, i.e. passing the shield element 22.

Furthermore, the second outlet 12 comprises a second annular collecting channel 25 which extends in a peripheral direction around the separation space 2 radially outside and at the level of the channel 23. The second annular collecting channel 25 is provided in the wall of the stationary casing 1. The channel 23 communicates with the second annular collecting channel 25 via the outlet holes 21 which thus extend between and connect the channel 23 and the second annular collecting channel 25.

The annular surface 20 comprises at least one opening 26 which is located inside the annular shield element 22. The opening 26 is de-signed as a central through flow opening and forms a part of the gas outlet channel 10.

The first outlet 12 comprises a first annular collecting channel 30, which extends around the separation space 2 radially outside the inner wall surface 3. Furthermore, at least one outlet hole 31 is provided to extend between the separation space 3 and the first annular collecting channel 30. The first outlet 11 may comprise one or several such outlet holes 31 provided at the lower end 1".

As can be seen in FIG. 1, the second annular collecting channel 25 of the second outlet 12 is connected to the first annular collecting channel 30 of the first outlet 11 via at least one connecting channel 32 which in the embodiment disclosed extends substantially in parallel with the axis x of rotation. It is of course possible to provide more than one such connecting channel 32. From the first annular collecting channel 30 also at least one discharge conduit 33 extends for discharging the separated impurities from the centrifugal separator.

The centrifugal separator also comprises a lower annular end surface 35 which extends between the rotating member 4 and the inner wall surface 3. The lower end surface 35 is configured to transport liquid impurities radially outwardly to the second outlet 12. The lower end surface 35 is in the embodiments disclosed slightly conical and slopes outwardly and downwardly, see FIG. 1. However, it is to be noted that the lower end surface 35 also may be substantially planar or even slope slightly outwardly and upwardly. Furthermore, the centrifugal separator may comprise a number of guide elements (not disclosed) provided on the lower end surface 35 and arranged to promote the transport of impurities outwardly towards the inner wall surface 3 and the outlet holes 31.

The centrifugal separator disclosed may for instance be used for cleaning of gases containing impurities in the form of a liquid or in the form of solid particles and/or liquid particles, such as oil particles and/or oil mist, e.g. cutting liquids from a machine tool as in the example below. Such cutting liquids may contain or consist of oil, or water-based emulsions in which oil is included.

The gas to be cleaned is conveyed via the inlet 9 in to the space 15. Due to the rotation of the rotating member 4, the gas will be sucked into the gaps between the separation discs 7, wherein cutting liquid will get caught on these discs 7 and due to the centrifugal force be transported outwardly on the discs 7. Thereafter, the cutting liquid leaves the discs 7 and is thrown towards the inner wall surface 3. The cutting liquid will then flow downwardly on the inner wall surface 3 to the lower end surface 50 and the first outlet 11. From the first outlet 11, the cutting liquid will flow out through the outlet holes 31 into the first annular collecting channel 30. A part of the cutting liquid which hits the inner wall surface 3 will, due to the gas flow towards the gas outlet channel 10, be transported upwardly along the inner wall surface 3. This cutting liquid will flow into the channel 23 and be conveyed in the second annular collecting channel 25 via the outlet holes 21. From the second annular collecting channel 25 the separated cutting liquid is then transported down to the first annular collecting channel 30. All separated cutting liquid is thus transported to this collecting channel 30 and from there out of the centrifugal separator via the discharge conduit 33.

The device, or possibly the centrifugal separator, comprises a supply member 50, which is configured to permit supply of a liquid to form of an aerosol to be supplied to the gas to be cleaned. The supply member 50 comprises a supply conduit 51 with an outlet end 52. The supply conduit 51 is connected to a source containing the liquid to be supplied. The source comprises a liquid tank 53 which may form a part of the centrifugal separator. The aerosol may be formed by cutting liquid, as exemplified above, water particles, but also aerosols based on other liquids could be used, such as a viscosity decreasing substance.

The supply member 50 also comprises an ejector nozzle 56, which is connectable or connected to a pressurised gas conduit 57 and comprises a nozzle outlet 58. The nozzle outlet 58 is provided at the outlet end 52 of the supply conduit 51.

The nozzle outlet 58 is thus arranged permit ejection of the liquid in the form of the aerosol from the outlet end 52 of the supply conduit 51 by means of pressurised gas supplied to the ejector nozzle 56 and the nozzle outlet 58. The supply member 50 may be configured to permit continuous supply of the aerosol during the operation of the centrifugal separator. However, it is possible to let the supply take place intermittently.

The ejector nozzle 56 forms or encloses a nozzle space 59 into which the pressurised gas is supplied. The supply conduit 51 has an outlet tube portion 60, which extends to the outlet end 52. The outlet tube portion 60 is provided in the nozzle space 59 and extends along the ejector nozzle 56, or along a longitudinal axis x' of the ejector nozzle 56. In the embodiment disclosed, the longitudinal axis x' also forms a centre axis of the ejector nozzle 56 and the outlet tube portion 60.

The outlet tube portion 60 may extend from a rear wall 61 of the ejector nozzle 56 to the nozzle outlet 58. The outlet end 52 of the supply conduit 51, and of the outlet tube portion 60, and the nozzle outlet 58 lies in a common plane. This plane is perpendicular or substantially perpendicular to the longitudinal axis x'.

The outlet tube portion 60 may be tapering towards the outlet end 52. More specifically, the outlet tube portion 60 comprises in the embodiment disclosed a rear portion 62, a tapering portion 63 and a forward portion 64. The forward portion 64 and the rear portion 62 have a cylindrical shape. The forward portion 64 has a smaller diameter than the rear portion 62.

Furthermore, as shown in the embodiment disclosed, a needle 65 may be provided in the outlet tube portion 59 for adjusting the character of the ejected aerosol. The needle 65 extends along the longitudinal axis x' in the rear portion 61. The needle 65 is movable along the longitudinal axis x' by means of an actuator 66 to provide said adjustment of the character of the aerosol.

The pressurised gas conduit 57 is connected to a compressor 67 producing the pressurised gas, such as pressurised air. The compressor 67 may form a part of the device or the centrifugal separator.

A communication conduit 68 may be provided to extend between the pressurised gas conduit 57 and the tank 53. The communication conduit 68 provides one convenient way of pressurising the liquid tank 53.

A return conduit 69 may be provided to extend from the first outlet 11 to the liquid tank 53. In the embodiment disclosed the return conduit is connected to the discharge conduit 33 and the collecting channel 30. This is advantageous, especially when the liquid is cutting liquid used during machining in a machine tool. At least a part of the separated cutting liquid may then be returned to the liquid tank 53, and from the liquid tank 53 supplied to the supply member 50.

The supply member 50 is arranged to permit the supply of the aerosol into the inlet channel 9, i.e. to a position located upstream the inlet and outside the separation space. The liquid or aerosol is thus added to the gas to be cleaned before this gas reaches the separation space 2 and the rotating member 4.

In the embodiment disclosed, the supply member 50 is provided in or comprises a pipe element 70, which is mounted to a pipe conduit 9' which forms the inlet channel 9. The pipe element 70 extends to the inlet channel 9 and has a first end 71, which is open to the inlet channel 9, and a second end 72, which is turned away from the first end 71 and from the inlet channel 9 and the pipe conduit 9'. The ejector nozzle 56 is provided in the pipe element 70 between the first end 71 and the second end 72. The ejector nozzle 56 is configured to eject the liquid towards the inlet channel 9 in the direction of the gas flow. It is advantageous to supply the aerosol to the gas before the gas reaches the separation space 2 and the rotating member 4. In such a way, the aerosol will manage to humidify and adhere to the particles before these reach the surfaces of separation discs 7 of the rotating member 4 and also other surfaces in the separation space 2.

Furthermore, the pipe element 70 has in the embodiment disclosed an end wall 73, at which the ejector nozzle 56 is provided so that the nozzle outlet 58, is located between the end wall 73 and the first end 71. The end wall 73 comprises apertures 74 provided around the ejector nozzle 56 and forming an opening to an environment. In such a way, air from the environment may be sucked into the pipe element 70 and be mixed with the aerosol and then with the gas to be cleaned.

It should be noted that the supply member 50 as an alternative, instead of being provided in the pipe member 70, may be provided in the inlet channel 9. In this case the ejection of the aerosol is directed along the gas flow upwardly in parallel with the axis x of rotation, i.e. the axis x of rotation may be parallel, or substantially parallel, with the longitudinal axis x'. It may in this case be disclosed with the pipe member 70.

The invention is not limited to the embodiments disclosed but may be varied and modified within the scope of the following claims.

The invention claimed is:

1. A device comprising a centrifugal separator for cleaning of a gas, wherein the centrifugal separator comprises:
   a stationary casing, which encloses a separation space and permits the gas to flow therethrough,
   an inlet channel, which extends to the separation space and forms an inlet to the separation space for a gas flow of the gas to be cleaned,
   a rotating member, which is provided in the separation space downstream of the inlet with regard to the gas flow and arranged to rotate in a direction of rotation about an axis of rotation, wherein the rotating member comprises a plurality of separation discs and is adapted to bring the gas to rotate in the direction of rotation for separating by means of centrifugal forces at least a main part of the impurities from the gas,
   a gas outlet channel, which with regard to the gas flow is provided downstream of the rotating member for discharging the cleaned gas,
   at least a first outlet, which is provided for discharging a separated phase of the gas from the separation space,
   a supply member, which is configured to permit supply of a liquid in the form of an aerosol to be supplied to the gas to be cleaned and which comprises a supply conduit with an outlet end,
   wherein the supply member comprises an ejector nozzle connectable to a pressurized gas conduit and comprising a nozzle outlet, and wherein the nozzle outlet is provided at the outlet end of the supply conduit and arranged to permit ejection of the liquid in the form of said aerosol from the outlet end of the supply conduit by means of the pressurised gas supplied to the ejector nozzle and the nozzle outlet.

2. The device according to claim 1, wherein the supply conduit has an outlet tube portion extending to the outlet end and along the ejector nozzle.

3. The device according to claim 2, wherein the outlet tube portion is provided and extends in the ejector nozzle.

4. The device according to claim 2, wherein the outlet tube portion tapers towards the outlet end, and wherein a needle is provided in the outlet tube portion for adjusting a character of the ejected aerosol.

5. The device according to claim 1, wherein the ejector nozzle is configured to eject the liquid in the direction of the gas flow of the gas to be cleaned.

6. The device according to claim 1, wherein the supply conduit is connected to a source containing the liquid.

7. The device according to claim 6, wherein the centrifugal separator comprises a liquid tank forming said source.

8. The device according to claim 7, wherein the liquid tank is pressurised.

9. The device according to claim 8, wherein a communication conduit extends between the pressurised gas conduit and the liquid tank.

10. The device according to claim 7, wherein a return conduit extends from the at least first outlet to the tank.

11. The device according to claim 1, wherein the pressurised gas conduit is connected to a compressor producing the pressurised gas.

12. The device according to claim 11, wherein the compressor forms a part of the device.

13. A method for cleaning of a gas by centrifugation in a centrifugal separator comprising a stationary casing, which encloses a separation space and permits the gas to flow therethrough, wherein the method comprises the steps of:
feeding the gas to be cleaned to the separation space through an inlet channel,
bringing the gas to rotate in the separation space by means of a rotating member, which comprises a plurality of separation discs and is provided downstream of the inlet channel with regard to the gas flow and rotates in a direction of rotation about an axis of rotation, and thereby separating at least a main part of the impurities from the gas by means of centrifugal forces,
discharging the cleaned gas from the separation space through a gas outlet channel,
discharging a separated phase of the gas from the separation space through a first outlet,
supplying a liquid in the form of an aerosol to be supplied to the gas to be cleaned via a supply conduit having an outlet end, and
ejecting the liquid in the form of said aerosol from the outlet end of the supply conduit by supplying pressurised gas to an ejector nozzle having a nozzle outlet provided at the outlet end of the supply conduit.

14. The method according to claim 13, further comprising the steps of:
supplying the liquid from a liquid tank via the supply conduit, and
returning at least a part of the separated phase from the at least first outlet to the liquid tank.

15. The method according to claim 13, wherein the method is used for cleaning of gases from or around a machine tool, which contain cutting liquids in the form of water-based emulsions.

16. The device according to claim 3, wherein the outlet tube portion tapers towards the outlet end, and wherein a needle is provided in the outlet tube portion for adjusting a character of the ejected aerosol.

17. The device according to claim 2, wherein the ejector nozzle is configured to eject the liquid in the direction of the gas flow of the gas to be cleaned.

18. The device according to claim 3, wherein the ejector nozzle is configured to eject the liquid in the direction of the gas flow of the gas to be cleaned.

19. The device according to claim 4, wherein the ejector nozzle is configured to eject the liquid in the direction of the gas flow of the gas to be cleaned.

20. The device according to claim 2, wherein the supply conduit is connected to a source containing the liquid.

* * * * *